May 31, 1966 G. W. BROWN 3,253,296
APPARATUS FOR SCALDING FOWLS AT MULTIPLE TEMPERATURES
Filed Feb. 13, 1964 3 Sheets-Sheet 1

INVENTOR.
George W. Brown
BY
Newton, Hopkins & Jones
ATTORNEYS

May 31, 1966  G. W. BROWN  3,253,296
APPARATUS FOR SCALDING FOWLS AT MULTIPLE TEMPERATURES
Filed Feb. 13, 1964  3 Sheets-Sheet 3

INVENTOR.
George W. Brown
BY
Newton, Hopkins & Jones
ATTORNEYS

United States Patent Office 3,253,296
Patented May 31, 1966

3,253,296
APPARATUS FOR SCALDING FOWLS AT MULTIPLE TEMPERATURES
George W. Brown, Atlanta, Ga., assignor to Gainesville Machine Company, Inc., Gainesville, Ga., a corporation of Georgia
Filed Feb. 13, 1964, Ser. No. 344,777
3 Claims. (Cl. 17—11.2)

This invention relates to the processing of chickens and other fowl for sale as meat, and more particularly to a multiple temperature scalding apparatus for preparing a chicken or other fowl for the removal of feathers by manual operations, by picking machines, or by other means.

In the processing of chickens and other fowl for sale as meat, the feathers must be removed from the chicken or fowl during the processing. The removal of feathers from a chicken can be accomplished manually, by one of the various types of picking machines, or by other means. However, regardless of the manner in which the feathers are removed from the chicken, it is customary to scald the chicken prior to removal of the feathers. This is because it has been found that scalding the chicken prior to the removal of its feathers makes the removal of feathers from all portions of the chicken's body less difficult.

The scalding of chickens is customarily accomplished by spraying water against the body of the chicken or by immersing the body of the chicken in a vat of hot water. Good results are obtained when the water is at a temperature which heats the skin of the chicken to a degree sufficient for the feathers to be easily removed. However, water at this temperature frequently causes the skin of the chicken to be easily discolored by the abrasive effects of subsequent picking operations.

Some discoloration of the chicken's skin is acceptable with respect to most parts of the chicken in order to obtain the benefits with respect to picking feathers provided by water at this temperature. However, discoloration of the skin covering the chicken's breast is highly undesirable since it tends to lower public acceptance of the fully processed chicken. Thus, the scalding of chickens to permit the easy removal of feathers presents the problem of scalding the chicken with water sufficiently hot to permit the easy removal of feathers from hard-to-pick areas such as the neck, shoulders, thighs, and wings of the chicken while maintaining the temperature of the water sufficiently low so as not to cause the skin covering the breast of the chicken to be easily discolored.

The apparatus disclosed herein, for preparation of chickens and other fowls for the subsequent removal of feathers solve this and other problems commonly associated with the scalding of chickens. The invention accomplishes this improvement in the scalding of chickens by scalding those portions of the chicken's body that are difficult to pick with water sufficiently hot to permit the easy removal of feathers from these portions of the chicken's body, and by scalding the breast of the chicken with water at a temperature sufficiently low not to result in any discoloration of the skin covering the chicken's breast by subsequent picking operations.

The invention results in the chicken's being passed between a plurality of jets which serve to spray all portions of the chicken's body with hot water. Those jets which spray the portions of the chicken's body other than its breast spray the chicken with water at a temperature which makes the picking of the feathers from a chicken relatively easy. Those jets which spray the breast of a chicken spray with water at a temperature slightly less than that temperature which would not cause subsequent discoloration of the skin on the breast of a chicken.

The water sprayed on the breast of a chicken combines with water flowing to the breast from other portions of the body, then causing the water on the breast of the chicken to be at a temperature above the temperature of the water sprayed directly on the breast, and below the temperature of the water sprayed on other portions of the chicken's body. The temperature resulting from this combination of water on the breast of the chicken is that temperature that aids the removal of feathers from the breast of the chicken, but is sufficiently low not to cause any discoloration of the skin covering the breast of the chicken by subsequent picking operations.

The apparatus of the invention which accomplishes the multiple temperature scalding of the chickens comprises: a cabinet member through which a chicken is passed, the chicken being suspended from a conventional shackle; a plurality of jet members within the cabinet member; and a water circulating member to provide water to the jet members, the water being at a plurality of selected temperatures. The apparatus is relatively inexpensive to manufacture, and is highly durable in use. Moreover, the apparatus is extremely easy to operate; and, once placed in operation, the apparatus will operate for sustained periods of time without attention.

These and other features and advantages of the invention will be more clearly understood from the following detailed description and the accompanying drawings in which like characters of reference designate corresponding parts in all figures and in which.

Figure 1:
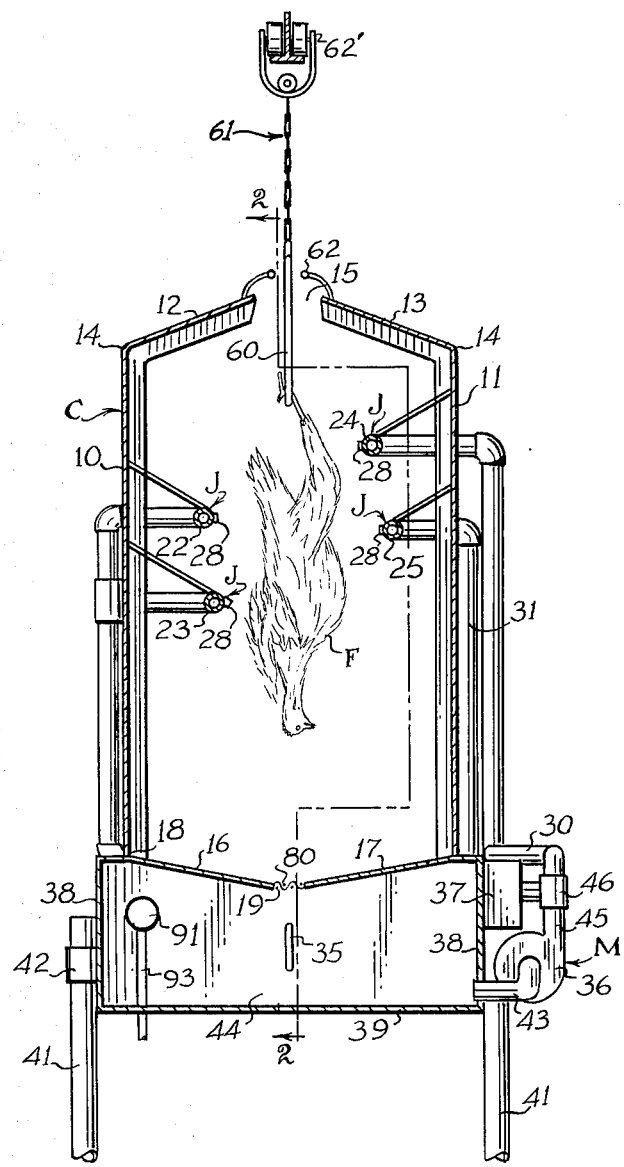
FIG. 1 is a transverse cross-sectional view of the multiple temperature scalding apparatus disclosed herein.
Figure 2:
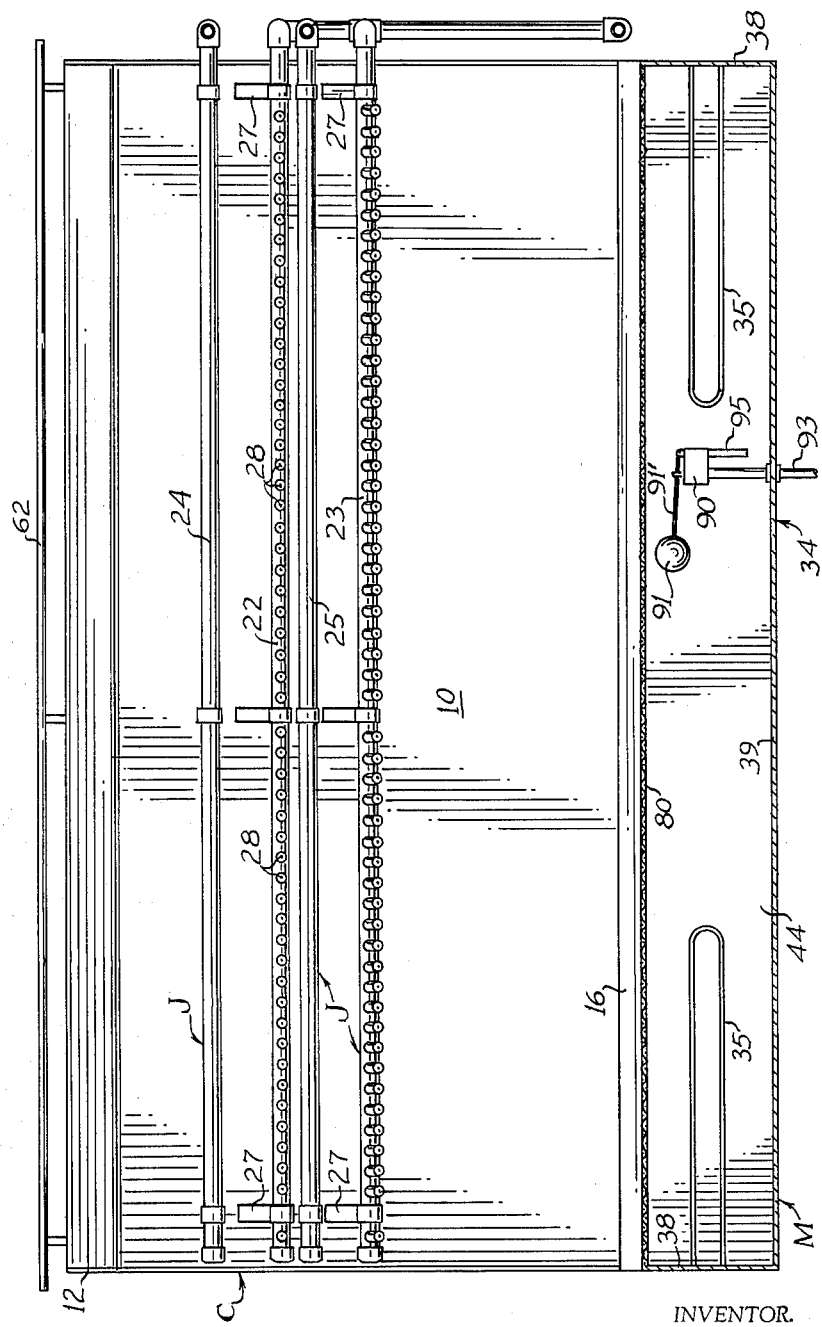
FIG. 2 is a longitudinal cross-sectional view of the multiple temperature scalding apparatus disclosed herein taken along line 2—2 in FIG. 1 and showing the plurality of jet pipes extending along the length of the cabinet but with the chicken and shackle omitted.
Figure 3:
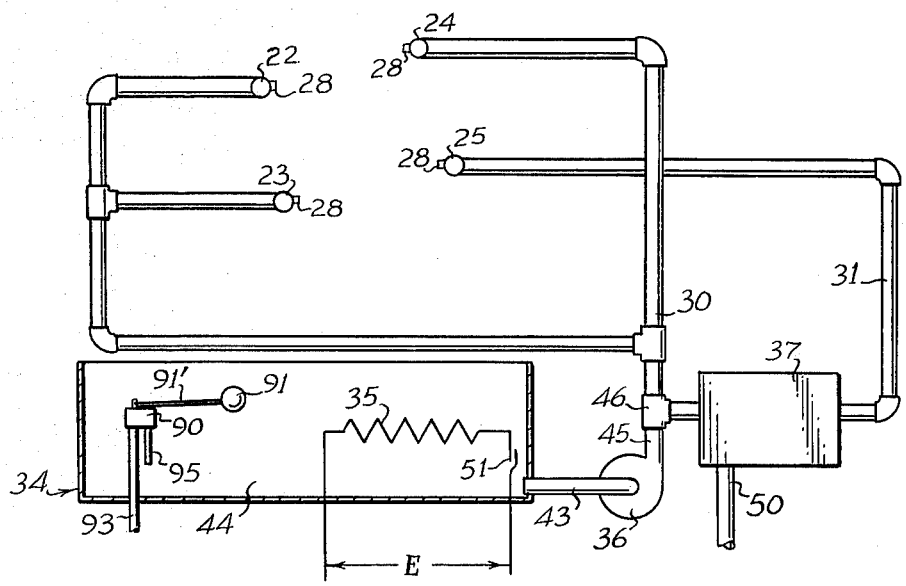
FIG. 3 is a schematic presentation of the multiple temperature scalding apparatus disclosed herein.

These figures and the following detailed description disclose a specific embodiment of the invention, but the invention is not limited to the details disclosed since it may be embodied in other equivalent forms.

The apparatus and method disclosed herein for multiple temperature scalding of chickens is best understood in terms of the apparatus itself. The multiple temperature scalding apparatus comprises a plurality of jet members J positioned within a cabinet member C so as to spray water which is at a plurality of temperatures, on a chicken F as the chicken passes through the cabinet member C, and a water circulating member M for providing water to the jet members J at a plurality of temperatures. In the specific embodiment of the multiple temperature scalding apparatus disclosed herein, the cabinet member C is formed of two rectangular plates 10 and 11 which are vertically positioned parallel to each other, guide plates 12 and 13 extending toward each other from the upper edges 14 of the rectangular plates 10 and 11 to define a channel 15, and two drain plates 16 and 17 which extend toward each other from the lower edges 18 of the rectangular plates 10 and 11 to define a drain slot 19. The drain plates 16 and 17 are inclined downward toward the slot 19. It will be understood from this description of the cabinet member C that the cabinet member C is an elongated box-like structure having the channel 15 and the slot 19 extending along its length.

The jet members J are positioned within the cabinet member C; and, in the specific embodiment of the multiple temperature scalding apparatus disclosed herein, the jet members J are pipe sections 22, 23, 24 and 25 which are mounted on the rectangular plates 10 and 11 within the cabinet member C. Each of the pipe sections 22, 23, 24 and 25 is mounted to a rectangular plate 10 or 11 by a plurality of brackets 27. Each of the pipe sections 22, 23, 24 or 25 has a plurality of nozzles 28 distributed along its length. The pipe sections 22, 23, 24 and 25 extend the full length of the rectangular plates 10 and 11. The pipe sections 22, 23, and 24 are continuous at one end of the cabinet member C with an input pipe 30; and, the pipe section 25 is continuous at one end of the cabinet member C with an input pipe 31. The vertical positioning of the pipe sections 22, 23, 24, and 25 within the cabinet member C will be understood when the operation of the apparatus of the invention and the method of the invention are understood.

The water circulating member M comprises: a tank 34 positioned beneath the slot 19 to receive water from the nozzles 28; a heater 35 to heat the water in the tank 34; a pump 36 to pump water from the tank 34 to the input pipes 30 and 31; and, a mixer valve 37 which mixes cold water with the water that is to be pumped to the input pipe 31.

The tank 34 is a rectangular box formed by four side members 38 and a bottom member 39. A cover for the tank member 34 is formed by the drain plates 16 and 17 of the cabinet member C; and, it will be understood that water in the cabinet member C will drain from the cabinet member C, through the slot 19, into the tank 34.

The drain plates 16 and 17 extend outwardly beyond the rectangular plates 10 and 11 where the drain plates 16 and 17 are integral with the upper edges of opposite side members 38 of the tank 34. Thus, it will also be understood that the tank 34 of the water circulating member M and the cabinet member C form a single structure. The upper ends of a plurality of legs 41 are attached by brackets 42 to the sides 38 of the tank 34 and serve to position vertically the tank 34 of the water circulating member M and the cabinet member C with respect to a floor or other support surface (not shown).

The pump 36 is mounted outside of the tank 34 to a side 38 of the tank 34. The suction side of the pump 36 is joined by a connector pipe 43 to the interior 44 of the tank 34; and, the pressure side of the pump 36 is joined by a connector pipe 45 to a T-member 46, which serves to join the connector pipe 45 to both the input pipe 30 and the input pipe 31. The pump 36 is an electrically operated pump of known type. It will now be understood that the pump 36 pumps water from the interior 44 of the tank 34, through the connector pipes 43 and 45, and into the input pipes 30 and 31.

The mixer valve 37 is a conventional piece of apparatus in which water from two different inlets at two different temperatures is mixed to give water of a third temperature. In the present device, the mixer valve 37 is connected to the T-member 46 to receive water substantially at the temperature of water in the tank 34, and to a supply pipe 50 to receive water from any convenient source of relatively cool water. The mixer valve 37 mixes proper amounts of water from each source to achieve water of the desired temperature for the input pipe 31.

The water is fed directly from the tank 34 to the pipe sections 22, 23 and 24 by the input pipe 30, and is fed at a reduced temperature to the pipe section 25, thence to input pipe 31, because of the action of the mixer valve 37. Water is heated in the tank 34 by the heater 35. The heater 35 is an electrical heater of known type. The heater 35 is positioned within the tank 34, and is controlled by a thermostatic element 51 which causes the heater 35 to maintain the desired temperature of the water in the interior 44 of the tank 34. Thus, the heater 35 serves to maintain the temperature of the water that is piped direcly to the pipe sections 22, 23 and 24 and is diluted by the action of the mixer valve 37 to a particular preselected temperature.

*Operation*

From the foregoing description of a specific embodiment of the multiple temperature scalding apparatus, the operation of the apparatus of the invention and the method of the invention will now be apparent. A chicken F to be scalded is suspended, head lowermost, by a shackle 60 which holds the legs of the chicken and which is carried by a conveyor 61. This shackle and conveyor arrangement is well known, and when the cabinet member C is positioned with the channel 15 beneath the conveyor, the conveyor 61 serves to move the chicken F through the cabinet member C with the shackle 60 extending through the channel 15. Guide bars 62 may be positioned above the channel 15 in known manner to engage the shackle 60 and guide the shackle 60 into the channel 15.

The pipe sections 22, 23, 24 and 25 are positioned within the cabinet member C so that, as the chicken F passes through the cabinet member C, the nozzles 28 extending from the pipe section 22 spray water on the tail and back of the chicken, the nozzles 28 extending from the pipe section 23 spray water on the back, wings and neck of the chicken, the nozzles 28 extending from the pipe section 24 spray water on the legs and thighs of the chicken, and the nozzles 28 extending from the pipe section 25 spray water on the breast of the chicken. The water that is being sprayed on the chicken by the pipe sections 22, 23 and 24 is being pumped by the pump 36 through the input pipe 30 directly from the tank 34, and the heater 35 is adjusted in known manner to heat the water in the tank 34 to that temperature which will cause the water being sprayed by the pipe sections 22, 23 and 24 on the chicken F to be at that temperature which permits the easy removal of feathers from the chicken. Although water at this temperature is not sprayed by any of the pipe sections 22, 23 and 24 on the breast of the chicken, water at this temperature flows and splashes from other portions of the body of the chicken F to the breast of the chicken F.

However, water from the pipe section 25 is being sprayed directly on the breast of the chicken F, and the temperature of this water has been reduced by the action of the mixing valve 37 to a temperature that causes this water to mix with water flowing from other portions of the chicken's body to the breast of the chicken F and provide water on the breast of the chicken F which is at a temperature sufficiently low not to cause any subsequent discoloration of the skin covering the breast of the chicken. Thus, the water sprayed on the breast of the chicken F from the pipe section 25 serves to heat both the breast of the chicken F and to cool water flowing to the breast of the chicken F from other portions of the body of the chicken F. This results in the scalding of the breast of the chicken F at a temperature which is sufficiently high to aid in the removal of feathers from the breast of the chicken F but which is sufficiently low not to cause any discoloration of the skin on the breast of the chicken F by subsequent picking operation.

Most of the water striking the body of the chicken F from the pipe sections 22, 23, 24 and 25 flows from the body of the chicken F and down between the rectangular plates 10 and 11 to the drain plates 16 and 17 where it passes through the slot 19 into the tank 34. A screen 80 is across the slot 19 to prevent feathers that are washed from a chicken F from entering the tank 34 with the water.

Although the water added to the water from the tank 34 by the mixer valve 48 is relatively cool and although the chicken F absorbs a substantial amount of the heat in the water sprayed onto a chicken F in the cabinet member C, the water returning to the tank 34 from the cabinet member C is relatively warm. Thus, after initial heating of the water in the tank 34, only a small amount of heat is required to maintain the temperature of the water in the tank 34 at a selected temperature. Thus, the recirculation of water provided by the apparatus insures that the apparatus is relatively inexpensive to operate.

However, it will be understood that some of the water sprayed onto the body of a chicken F as the chicken F passes through the cabinet member C will adhere to the feathers of the chicken, and will be removed from the cabinet member C with the chicken F, and that water must be added in order to maintain a fixed amount of water for circulation in the apparatus of the invention. The water added by the mixer valve 37 as the mixer valve lowers the temperature of the water to a temperature which will not cause subsequent discoloration of the skin covering the breast of the chicken will partially compensate for this loss of water.

However, in order to maintain the water in the apparatus of the invention at a substantially constant level, a float valve 90 of known type is positioned within the tank 34. The float valve 90 has a float 91 which moves in response to changes in the level of water in the tank 34. The float 91 acts through the arm 91' to open the float valve 90 when the water level drops, and to close the float valve 90 when the water level rises to a predetermined level in the tank 34. The required additional water enters the float valve 90 through an intake pipe 93 connected to any convenient source (not shown) of water and the water is discharged into the tank 34 from the float valve 90 through a discharge pipe 95.

It will now be understood from the foregoing description of operation of the apparatus of the invention that the invention comprises the spraying of all portions of the body of a chicken F with water at that temperature which causes the feathers of a chicken to be easily removable from such hard-to-pick areas as the hocks, wings, and back of the chicken F, and spraying the breast of a chicken with water at a lower temperature which, when combined with water flowing to the breast from other portions of the chicken's body, results in the heating of the breast of the chicken to a temperature which permits feathers to be easily removable from the breast of a chicken without causing the skin covering the chicken's breast to be easily discolored by subsequent picking operations. It will also be understood that, regardless of the apparatus employed to spray the body of a chicken F with water at the two required temperatures, feathers will be more easily removable from the body of the chicken, and discoloration of the skin covering the breast of a chicken will be prevented.

The apparatus disclosed herein for multiple temperature scalding of chickens is particularly well-suited to the method of the invention in that the recirculation of water makes the apparatus relatively inexpensive to operate. Moreover, the apparatus is relatively simple in construction; and, when made of rust resistant material such as aluminum or galvanized steel, it is highly durable in use and easy to maintain. The heater 35 and the mixer valve 37 permit a variety of temperature combinations to be used depending upon those temperatures most desirable when scalding a chicken or other fowl. Moreover, regardless of the temperatures used, the temperature of the water sprayed on the breast of the chicken provides positive control of the temperature at which the breast of the chicken is scalded.

It will be obvious to those skilled in the art that many variations may be made in the embodiment chosen for the purpose of illustrating the present invention without departing from the scope thereof as defined by the appended claims.

What is claimed as invention is:

1. Apparatus for the multiple temperature scalding of a fowl comprising a plurality of first jet members positioned relative to said fowl so as to spray fluid on selected portions of said fowl; a plurality of second jet members positioned relative to said fowl so as to spray fluid on portions of said fowl other than those portions sprayed by said first jet members; a tank member containing a fluid; means for heating a fluid within the tank member; means for pumping a fluid from said tank member to said first jet members so that said fluid is sprayed from said first jet members; means for pumping a fluid from said tank member to said second jet members so that said fluid is sprayed from said second jet members; and mixing means operably positioned intermediate said tank member and said second jet members for mixing with fluid from said tank member fluid having a lower temperature than fluid in said tank member.

2. An apparatus for the multiple temperature scalding of fowl including a cabinet, a first means in said cabinet for spraying liquid on one portion of a fowl passing through said cabinet, a second means in said cabinet for spraying liquid on a different portion of said fowl, means for delivering fluids at different temperatures to said first means and said second means, said last mentioned means including a single source of fluid, a single heating means for said source, and separate fluid delivery means from said source to said first means and to said second means.

3. An apparatus for the multiple temperature scalding of fowl including a cabinet, a first means in said cabinet for spraying liquid on one portion of a fowl passing through said cabinet, a second means in said cabinet for spraying liquid on a different portion of said fowl, means for delivering fluids at different temperatures to said first means and to said second means including a single source of fluid, a single heating means for said source, and separate fluid delivering means to said first and second means including a mixer valve for introducing fluid at a temperature different from the temperature of the fluid from said heating means into the fluid delivered from said heating means to one of said spraying means.

References Cited by the Examiner

UNITED STATES PATENTS

| | | | |
|---|---|---|---|
| 2,549,070 | 4/1951 | Drews | 17—11.2 |
| 2,663,049 | 12/1953 | Van Dolah | 17—45 |
| 2,667,661 | 2/1954 | Long | 17—45 |
| 2,727,273 | 12/1955 | Long | 17—11.2 |
| 2,732,583 | 1/1956 | Van Dolah | 17—11.2 |
| 2,810,927 | 10/1957 | Adams et al. | 17—11.2 |
| 2,830,318 | 4/1958 | Zebarth | 17—45 |
| 2,924,845 | 2/1960 | Zebrath | 17—11.2 |

SAMUEL KOREN, *Primary Examiner.*

LUCIE H. LAUDENSLAGER, *Examiner.*